United States Patent
Mattina et al.

(10) Patent No.: US 11,922,169 B2
(45) Date of Patent: Mar. 5, 2024

(54) REFACTORING MAC OPERATIONS

(71) Applicant: Arm Limited, Cambridge (GB)

(72) Inventors: Matthew Mattina, Boylston, MA (US); Shidhartha Das, Upper Cambourne (GB); Glen Arnold Rosendale, Palo Alto, CA (US); Fernando Garcia Redondo, Cambridge (GB)

(73) Assignee: Arm Limited, Cambridge (GB)

( * ) Notice: Subject to any disclaimer, the term of this patent is extended or adjusted under 35 U.S.C. 154(b) by 136 days.

(21) Appl. No.: 17/674,503

(22) Filed: Feb. 17, 2022

(65) Prior Publication Data
US 2022/0179658 A1 Jun. 9, 2022

Related U.S. Application Data

(63) Continuation of application No. PCT/GB2020/052053, filed on Aug. 27, 2020, which
(Continued)

(51) Int. Cl.
*G06F 9/38* (2018.01)
*G06F 7/487* (2006.01)
(Continued)

(52) U.S. Cl.
CPC .......... *G06F 9/3893* (2013.01); *G06F 7/4876* (2013.01); *G06F 7/5443* (2013.01);
(Continued)

(58) Field of Classification Search
None
See application file for complete search history.

(56) References Cited

U.S. PATENT DOCUMENTS

| 2015/0067273 A1 | 3/2015 | Strauss et al. |
| 2018/0247192 A1 | 8/2018 | Fick et al. |

(Continued)

OTHER PUBLICATIONS

Karakiewicz et al., "175 GMACS/mW Charge-Mode Adiabatic Mixed-Signal Array Processor," 2006 Symposium on VLSI Circuits, 2006. Digest of Technical Papers., Honolulu, HI, USA, 2006, pp. 100-101, doi: 10.1109/VLSIC.2006.1705329.

(Continued)

*Primary Examiner* — Scott C Sun
(74) *Attorney, Agent, or Firm* — Leveque Intellectual Property Law, P.C.

(57) ABSTRACT

A method and apparatus for performing refactored multiply-and-accumulate operations is provided. A summing array includes a plurality of non-volatile memory elements arranged in columns. Each non-volatile memory element in the summing array is programmed to a high resistance state or a low resistance state based on weights of a neural network. The summing array is configured to generate a summed signal for each column based, at least in part, on a plurality of input signals. A multiplying array is coupled to the summing array, and includes a plurality of non-volatile memory elements. Each non-volatile memory element in the multiplying array is programmed to a different conductance level based on the weights of the neural network. The
(Continued)

multiplying array is configured to generate an output signal based, at least in part, on the summed signals from the summing array.

20 Claims, 13 Drawing Sheets

Related U.S. Application Data is a continuation of application No. 16/556,101, filed on Aug. 29, 2019, now abandoned.

(51) Int. Cl.
  *G06F 7/544* (2006.01)
  *G06F 9/30* (2018.01)
  *G06F 17/16* (2006.01)
  *G06N 3/06* (2006.01)

(52) U.S. Cl.
  CPC .......... *G06F 9/30014* (2013.01); *G06F 17/16* (2013.01); *G06N 3/06* (2013.01)

(56) References Cited

U.S. PATENT DOCUMENTS

| | | |
|---|---|---|
| 2019/0042915 A1 | 2/2019 | Akin et al. |
| 2020/0242461 A1 | 7/2020 | Tran et al. |
| 2023/0186086 A1* | 6/2023 | Moon .................... G06N 3/08 706/25 |

OTHER PUBLICATIONS

Merrikh-Bayat et al., "High-Performance Mixed-Signal Neurocomputing With Nanoscale Floating-Gate Memory Cell Arrays," in IEEE Transactions on Neural Networks and Learning Systems, vol. 29, No. 10, pp. 4782-4790, Oct. 2018, doi: 10.1109/TNNLS.2017.2778940.

Office Action for related U.S. Appl. No. 16/451,205 dated Mar. 30, 2022.

Office Action for related U.S. Appl. No. 16/451,205 dated Sep. 15, 2022.

Chi et al., "Processing-in-Memory in ReRAM-based Main Memory," SEAL-lab Technical Report—No. 2015-001 (Apr. 29, 2016).

* cited by examiner

REFACTORING MAC OPERATIONS

CROSS-REFERENCE TO RELATED APPLICATIONS

This application is a continuation of International Application No. PCT/GB2020/052053 (filed on Aug. 27, 2020), which claims priority to U.S. application Ser. No. 16/556,101 (filed on Aug. 29, 2019), the contents of which are incorporated herein by reference in their entireties.

BACKGROUND

The present disclosure relates generally to machine-learning (ML), and more particularly, to multiply-and-accumulate (MAC) operations for ML applications and processors.

Non-Volatile Memory (NVM)-based crossbar architectures provide an alternative mechanism for performing MAC operations in machine-learning algorithms, particularly, neural-networks. The mixed-signal approach using NVM-bit cells relies upon Ohm's law to implement multiply operations by taking advantage of the resistive nature of emerging NVM technologies (e.g., phase change memory (PCM), resistive random-access memory (RRAM), correlated electron random access memory (CeRAM), and the like). An application of a voltage-bias across an NVM-bit cell generates a current that is proportional to the product of the conductance of the NVM element and the voltage-bias across the cell.

Currents from multiple bit cells are added in parallel to implement an accumulated sum. Thus, a combination of Ohm's law and Kirchoff's current law implements multiple MAC operations in parallel. These, however, can be energy-intensive when implemented using explicit multipliers and adders in the digital domain.

MAC operations are utilized in ML applications, such as artificial neural networks (ANNs) including deep neural networks (DNNs), convolutional neural networks (CNNs), etc. MAC acceleration utilizing NVM crossbars requires programming NVM elements with precision conductance levels that represent a multi-bit weight parameter. Due to inherent device limitations, the bit-precision that can be represented is limited to 4 or 5 bits, which provides 16 to 32 distinct conductance levels. This complicates the weight programming step since the entire crossbar array of NVM bits needs to be precisely programmed (capacities of 1-10 Mb are typical).

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
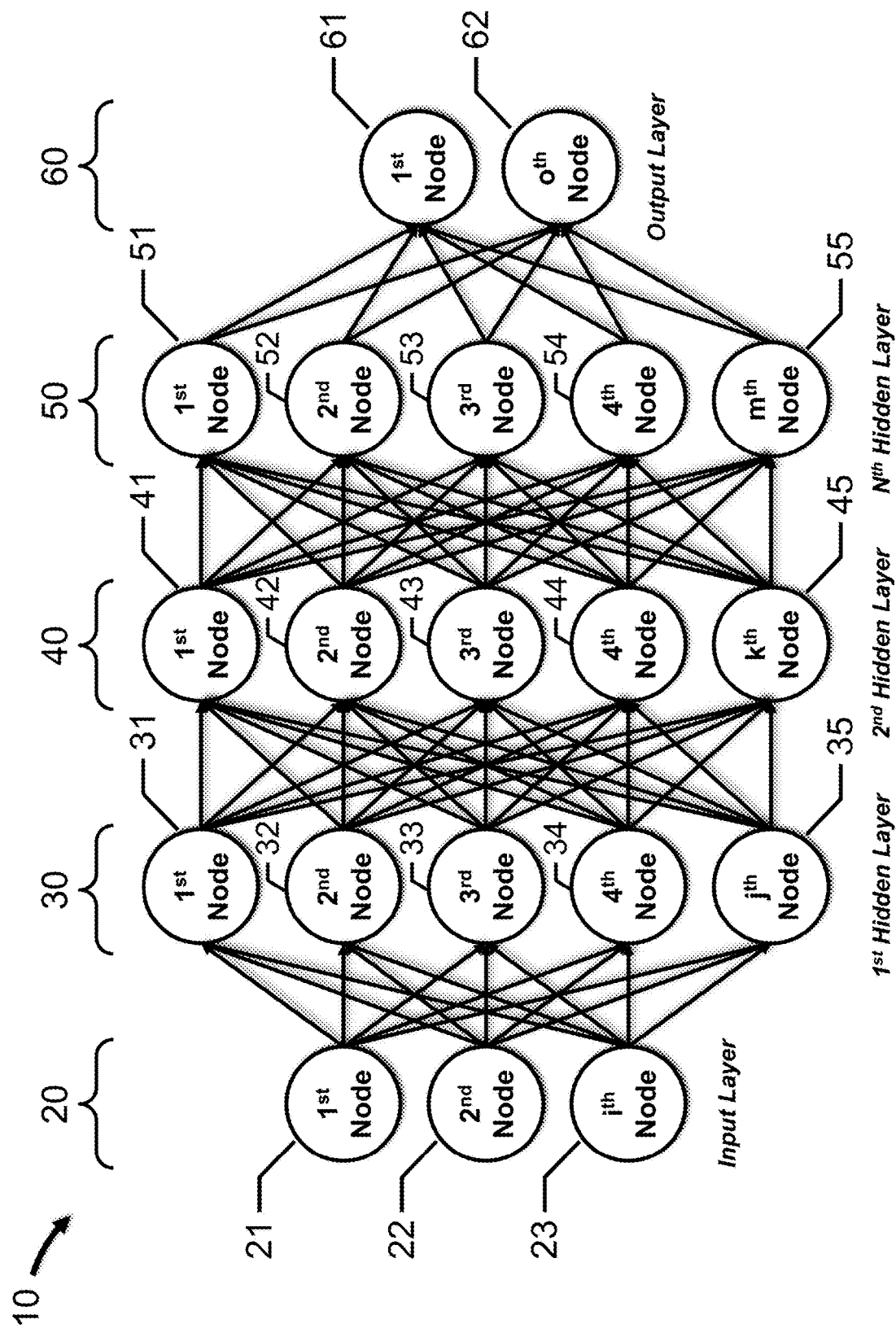
FIG. 1A depicts ANN, in accordance with an embodiment of the present disclosure.

Specific embodiments of the present disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

In accordance with the present disclosure, there is provided an improved technique for refactoring MAC operations to reduce programming steps in such systems described above.

In one embodiment of the present disclosure, an apparatus includes a summing array and a multiplying array. The summing array includes a plurality of non-volatile memory elements arranged in columns. Each non-volatile memory element in the summing array is programmed to a high resistance state or a low resistance state based on weights of a neural network. The summing array is configured to generate a summed signal for each column based, at least in part, on a plurality of input signals. The multiplying array is coupled to the summing array, and includes a plurality of non-volatile memory elements. Each non-volatile memory element in the multiplying array is programmed to a different conductance level based on weights of a neural network. The multiplying array is configured to generate an output signal based, at least in part, on the summed signals from the summing array.

ANNs, such as DNNs, CNNs, etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, convolution operations performed by CNNs.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1A depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Figure 1B:
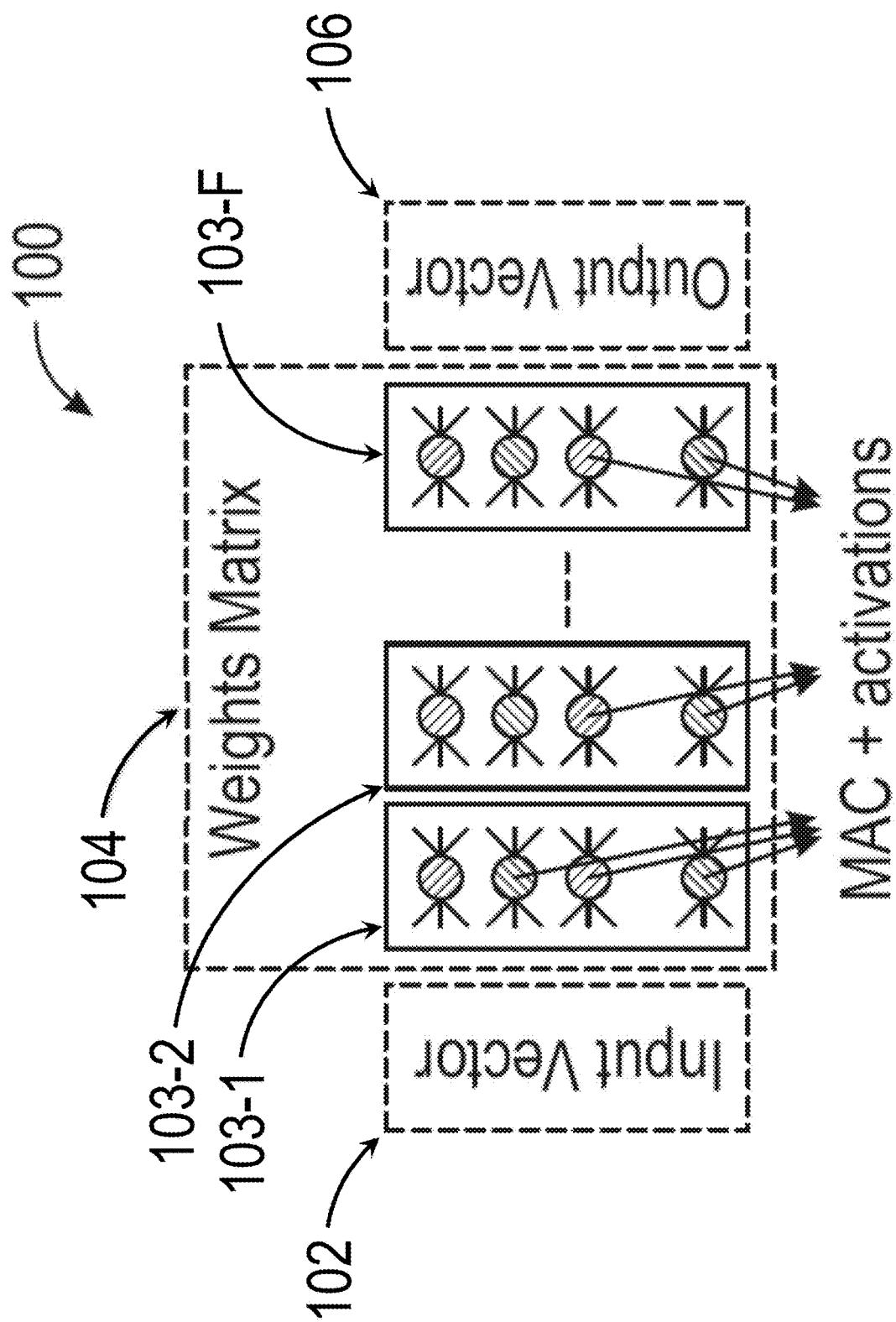
FIG. 1B depicts a high-level block diagram of an ANN, in accordance with an embodiment of the present disclosure.

FIG. 1B depicts a high-level block diagram 100 of an ANN that uses MAC operations, in accordance with an embodiment of the present disclosure.

The MAC operation may be represented by Equation 1, where element b and element c are multiplied together, added to the value, a, stored in the accumulator, and then stored as a new value, a, in the accumulator.

$$a \leftarrow a + (b \cdot c) \tag{Eq. 1}$$

The composition of a group of MACs may represent dot-products and vector-matrix multiplication. FIG. 1B represents a simple, multi-layer fully connected ANN 100, such as ANN 10. Each of the neurons in first layer 103-1 performs a MAC operation between input vector 102 and the corresponding weights in matrix 104. An activation function is applied to the partial result, and an output vector is generated, which is provided as the input vector to the next layer, i.e., second layer 103-2. This process takes place for every neuron in each layer. For example, the last layer 103-L performs MAC operations between the output vector of the preceding layer and the corresponding weights in matrix 104. An activation function is applied to the partial result, and an output vector 106 is generated. In many embodiments, an output layer may follow layer 103-L.

A CNN may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2A:
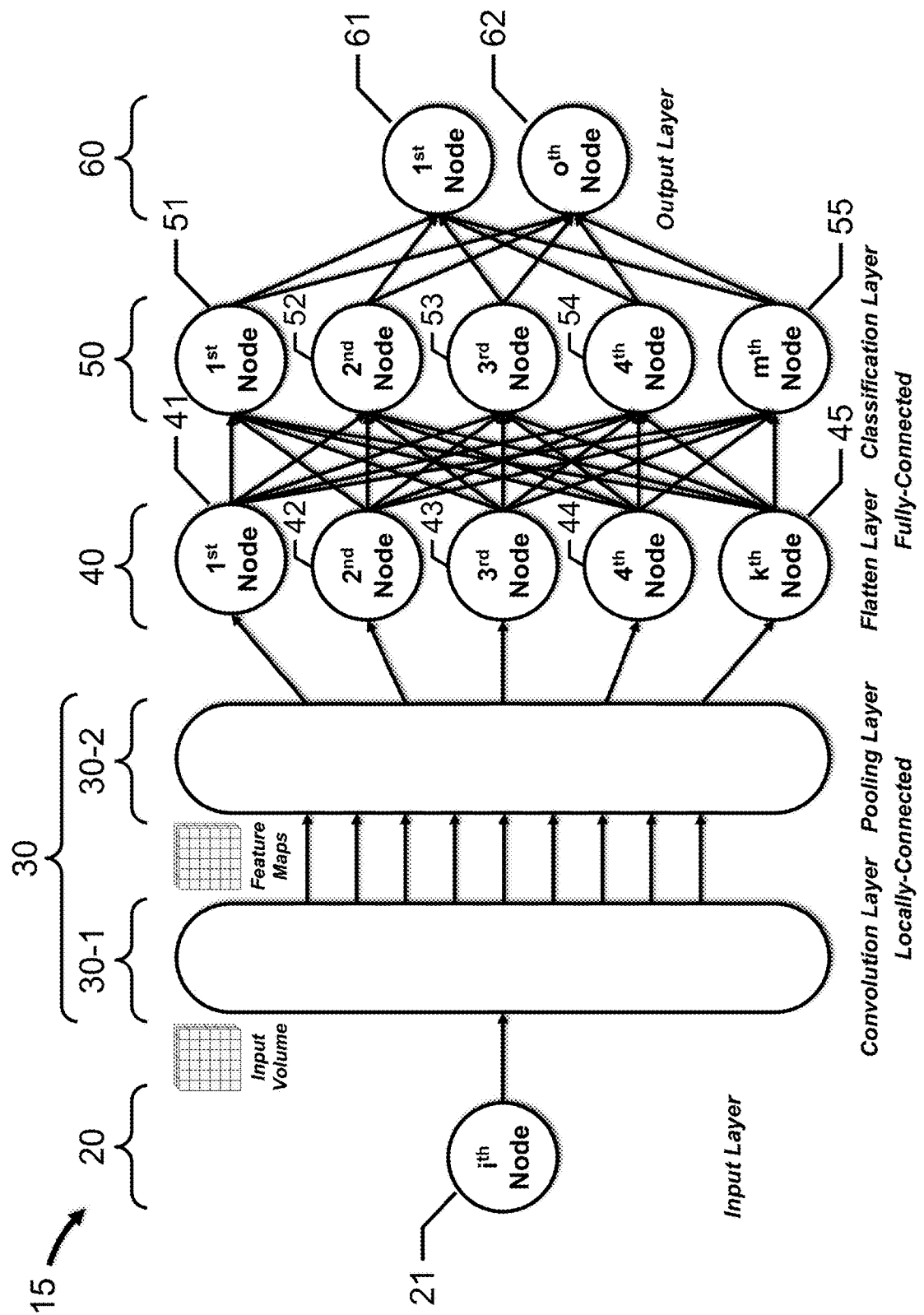
FIG. 2A depicts CNN, in accordance with an embodiment of the present disclosure.

FIG. 2A depicts CNN 15, in accordance with an embodiment of the present disclosure.

CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Figure 2B:
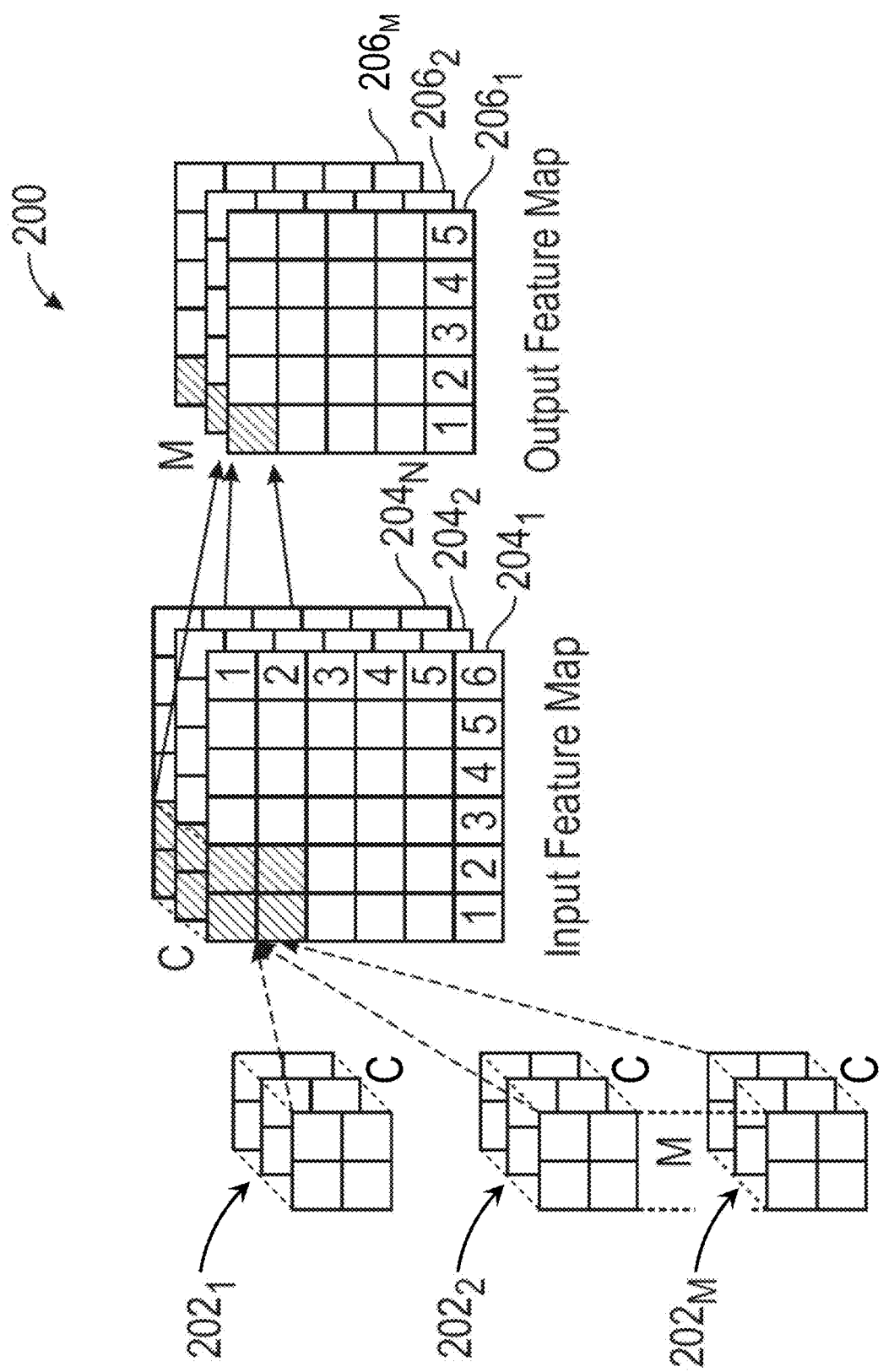
FIG. 2B depicts a convolution operation within a convolutional layer of a CNN, in accordance with an embodiment of the present disclosure.

FIG. 2B depicts a convolution operation 200 within a convolutional layer 30 of a CNN 15, in accordance with an embodiment of the present disclosure. This convolutional layer generally includes "M" filters, "C" input channels, "C" input feature maps (i.e., one input feature map for each input channel) and "M" output feature maps (i.e., one output feature map for each filter). Each filter has "C" weight sets (i.e., each filter has a weight set for each input channel), and is convolved across the input feature maps to produce an output feature map corresponding to that filter. Convolutional layers generally require the movement of large amounts of data, generate a significant computational load, and require buffers of considerable size to store intermediate values.

More particularly, convolutional operation 200 includes "M" filters $202_1$, $202_2$, ..., $202_M$, input feature maps 204 that include "C" input data matrices $204_1$, $204_2$, ..., $204_N$ (i.e., N equals C) and output feature maps 206 that includes "M" output data matrices $206_1$, $206_2$, ..., $206_M$. For illustration purposes, the weight set within each filter includes a 2×2 weight matrix, each input feature map includes a 6×6 input data matrix, and each output feature map includes a 5×5 output data matrix. The total number of operations are 2×2×N×5×5×M for the specific arrangement shown in FIG. 2B.

Figure 2C:
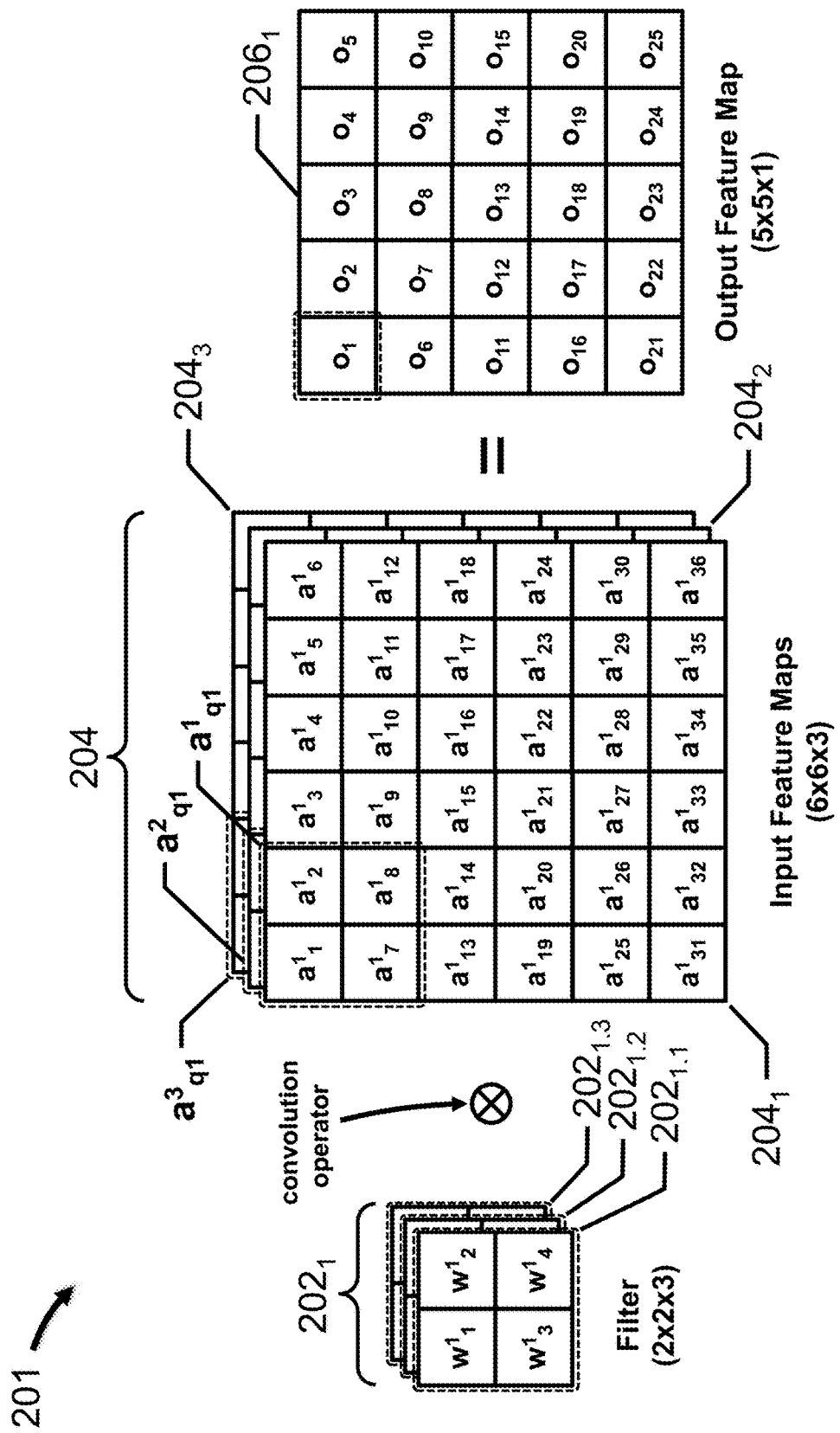
FIG. 2C depicts another convolutional layer operation for a CNN, in accordance with an embodiment of the present disclosure.

FIG. 2C depicts another convolutional layer operation 201 for CNN 15, in accordance with an embodiment of the present disclosure. Convolution layer operation 201 is a simplified version of convolution layer operation 200 that includes three input channels, i.e., "C" and "N," equal 3, and a single filter $202_1$, i.e., "M" equals 1.

Input feature maps 204 (6×6×3) include input data matrix $204_1$, input data matrix $204_2$ and input data matrix $204_3$, filter $202_1$ (2×2×3) includes weight matrix $202_{1.1}$ ($w^1$), weight matrix $202_{1.2}$ ($w^2$), and weight matrix $202_{1.3}$ ($w^3$), and output data matrix $206_1$ (5×5×1) includes an output data matrix. Filter $202_1$ is convolved with input feature maps 204 to produce an output feature map 206 with a single output data matrix $206_1$. In this example, the output data matrix element $o_1$ is the sum of the dot products of filter $202_{1.1}$ ($w^1$) and the upper left quadrant of input data matrix $204_1$ ($a^1_{q1}$), filter $202_{1.2}$ ($w^2$) and the upper left quadrant of input data matrix $204_2$ ($a^2_{q1}$), and filter $202_{1.3}$ ($w^3$) and the upper left quadrant of input data matrix $204_3$ ($a^3_{q1}$).

More particularly, the dot product of filter $202_{1.1}$ ($w^1$) and the upper left quadrant of input data matrix $204_1$ ($a^1_{q1}$) is equal to $w^1_1 \cdot a^1_1 + w^1_2 \cdot a^1_2 + w^1_3 \cdot a^1_7 + w^1_4 \cdot a^1_8$. The dot products of filter $202_{1.2}$ ($w^2$) and the upper left quadrant of input data matrix $204_2$ ($a^2_{q1}$), and filter $202_{1.3}$ ($w^3$) and the upper left quadrant of input data matrix $204_3$ ($a^3_{q1}$) are calculated in the same manner, i.e., the dot product of filter $202_{1.2}$ ($w^2$) and the upper left quadrant of input data matrix $204_2$ ($a^2_{q1}$) is equal to $w^2_1 \cdot a^2_1 + w^2_2 \cdot a^2_2 + w^2_3 \cdot a^2_7 + w^2_4 \cdot a^2_8$, and the dot product of filter $202_{1.3}$ ($w^3$) and the upper left quadrant of input data matrix $204_3$ ($a^3_{q1}$) is equal to $w^3_1 \cdot a^3_1 + w^3_2 \cdot a^3_2 + w^3_3 \cdot a^3_7 + w^3_4 \cdot a^3_8$.

Output data matrix element $o_2$ is the sum of the dot products of filter $202_{1.1}$ ($w^1$) and the next upper quadrant of input data matrix $204_1$, filter $202_{1.2}$ ($w^2$) and the next upper quadrant of input data matrix $204_2$, and filter $202_{1.3}$ ($w^3$) and the next upper quadrant of input data matrix $204_3$. The "next" upper quadrant in each input data matrix $204_1$, $204_2$ and $204_3$ has been shifted one column to the right relative to the first upper quadrant.

More particularly, the dot product of filter $202_{1.1}$ ($w^1$) and the next upper left quadrant of input data matrix $204_1$ is equal to $w^1_1 \cdot a^1_2 + w^1_2 \cdot a^1_3 + w^1_2 \cdot a^1_8 + w^1_4 \cdot a^1_9$. The dot products of filter $202_{1.2}$ ($w^2$) and the next upper left quadrant of input data matrix $204_2$, and filter $202_{1.3}$ ($w^3$) and the next upper left quadrant of input data matrix $204_3$ are calculated in the same manner, i.e., the dot product of filter $202_{1.2}$ ($w^2$) and the upper left quadrant of input data matrix $204_2$ ($a^2_{q1}$) is equal to $w^2_1 \cdot a^2_2 + w^2_2 \cdot a^2_3 + w^2_3 \cdot a^2_8 + w^2_4 \cdot a^2_9$, and the dot product of filter $202_{1,3}$ ($w^3$) and the upper left quadrant of input data matrix $204_3$ ($a^3_{q1}$) is equal to $w^3_1 \cdot a^3_2 + w^3_2 \cdot a^3_3 + w^3_3 \cdot a^3_8 + w^3_4 \cdot a^3_9$.

The remaining output data matrix elements $o_3$ to $o_5$ are calculated in a similar manner. After output data matrix element $o_5$ has been calculated, the "next" quadrant in each input data matrix $204_1$, $204_2$ and $204_3$ is shifted all the way to the leftmost column and down one row for the calculation of output data matrix element $o_6$. Output data matrix elements $o_7$ to $o_{10}$ are then calculated by shifting the quadrant in each input data matrix $204_1$, $204_2$ and $204_3$ one column to the right. The remaining output data matrix elements $o_{11}$ to $o_{15}$, $o_{16}$ to $o_{20}$, and $o_{21}$ to $o_{25}$ are calculated in a similar manner.

Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently by a central processing unit (CPU), specialized processor, hardware accelerator processing engine, etc., using optimized software libraries or specialized hardware. More particularly, an "IM2COL" software function may be used to convert the filter (weight) matrix and the input feature map (IFM) matrix for each convolution operation into an expanded format that is compatible with a GEMM operation. The IM2COL versions of each filter (weight) matrix and each IFM matrix are generated and stored in memory, and then loaded from memory and processed by the GEMM operation.

Figure 2D:
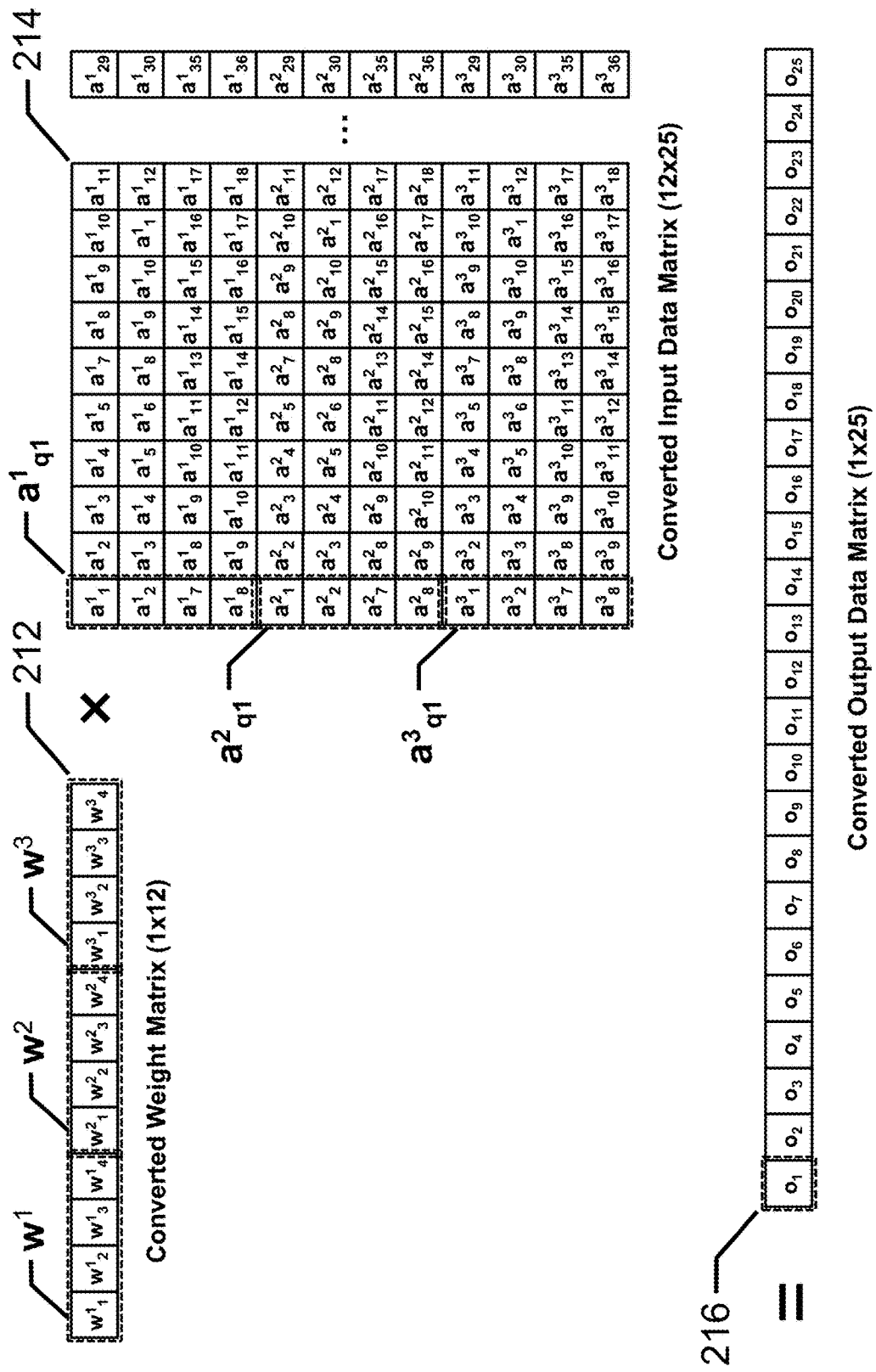
FIG. 2D depicts a converted convolutional layer operation for a CNN, in accordance with an embodiment of the present disclosure.

FIG. 2D depicts a converted convolutional layer operation for a CNN, in accordance with an embodiment of the present disclosure.

In one embodiment, the convolutional layer operation for CNNs executing on central processor units (CPUs) may be converted into generic matrix multiplication (GEMM) operations. Convolution layer operation 201 is converted into a GEMM operation by converting filter $202_1$ into converted weight matrix 212 (1×12) and input feature maps 204 into converted input data matrix 214 (12×25). After multiplying converted weight matrix 212 and converted input data matrix 214, converted output data matrix 216 (1×25) is then reformed into output data matrix $206_1$ (5×5). For ease of illustration, converted input data matrix 214 is depicted in abbreviated form.

In this example, converted output data matrix element $o_1$ is the sum of the dot products of the first (i.e., only) row of converted weight matrix 212 and the first column of converted input data matrix 214. As shown in FIG. 1B, the converted weight matrix 212 includes filter $202_{1,1}$ ($w^1$), filter $202_{1,2}$ ($w^2$), and filter $202_{1,3}$ ($w^3$), while the first row of converted input data matrix 214 includes the elements of the upper left quadrant of input data matrix $204_1$ ($a^1_{q1}$), the upper left quadrant of input data matrix $204_2$ ($a^2_{q1}$), and the upper left quadrant of input data matrix $204_3$ ($a^3_{q1}$).

More particularly, the converted output data matrix element $o_1$ is equal to $w^1_1 \cdot a^1_1 + w^1_2 \cdot a^1_2 + w^1_3 \cdot a^1_7 + w^1_4 \cdot a^1_8 + w^2_1 \cdot a^2_1 + w^2_2 \cdot a^2_2 + w^2_3 \cdot a^2_7 + w^2_4 \cdot a^2_8 + w^3_1 \cdot a^3_1 + w^3_2 \cdot a^3_2 + w^3_3 \cdot a^3_7 + w^3_4 \cdot a^3_6$. As shown above, the converted output data matrix element $o_1$ is equal to the output data matrix element $o_1$.

Figure 3A:
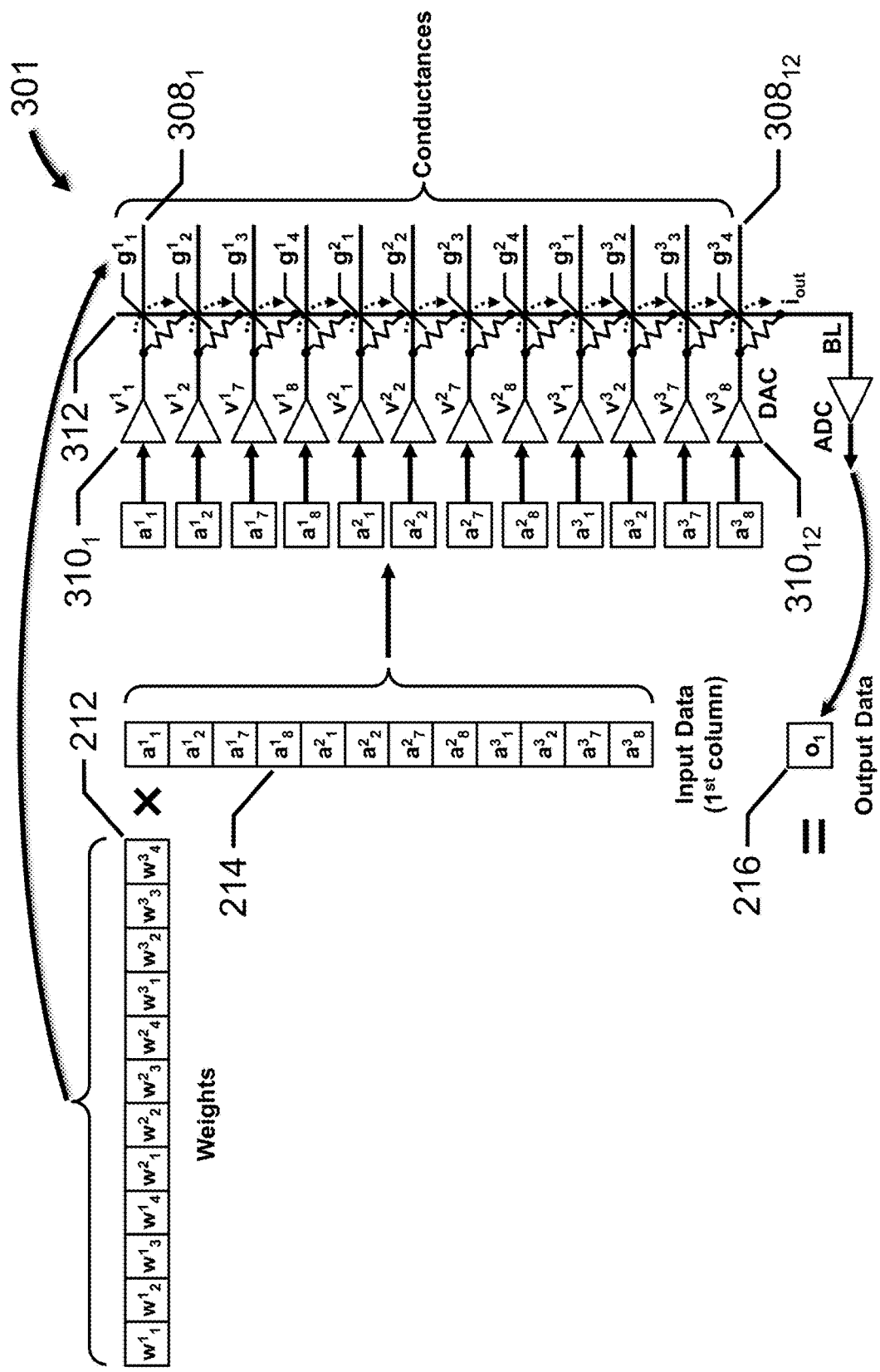
FIG. 3A depicts a portion of the convolutional layer operation of FIG. 2D implemented using an NVM crossbar, in accordance with an embodiment of the present disclosure.

FIG. 3A depicts a portion of the convolutional layer operation of FIG. 2D implemented using NVM crossbar 301, in accordance with an embodiment of the present disclosure.

NVM crossbar 301 includes twelve row signal lines 308, i.e., row signal lines $308_1, \ldots, 308_{12}$, and a single column signal line 312. A bitcell is disposed at each intersection of row signal lines 308 and the column signal line 312. Each bitcell includes one or more NVM elements that are programmed to represent a conductance value that is proportional to a particular of weight of filter $202_1$, i.e., $w^1_1$, $w^1_2$, etc. The conductances are represented by $g^1_1$, $g^1_2$, $g^1_3$, $g^1_4$, $g^2_1$, $g^2_2$, $g^2_3$, $g^2_4$, $g^3_1$, $g^3_2$, $g^3_3$, and $g^3_4$, which are proportional to weights $w^1_1$, $w^1_2$, $w^1_3$, $w^1_4$, $w^2_1$, $w^2_2$, $w^2_3$, $w^2_4$, $w^3_1$, $w^3_2$, $w^3_3$, and $w^3_4$, respectively.

In order to calculate the first element of converted output data matrix 216, i.e., $o_1$, input data from the first column of converted input data matrix 214 are provided to crossbar 302 as inputs $a^1_1$, $a^1_2$, $a^1_7$, $a^1_8$, $a^2_1$, $a^2_2$, $a^2_7$, $a^2_8$, $a^3_1$, $a^3_2$, $a^3_7$ and $a^3_8$ along row signal lines $308_1, \ldots, 308_{12}$, respectively. The input data are converted to analog voltages $v^1_1$, $v^1_2$, $v^1_7$, $v^1_8$, $v^2_1$, $v^2_2$, $v^2_7$, $v^2_8$, $v^3_1$, $v^3_2$, $v^3_7$ and $v^3_8$ by digital-to-analog convertors (DACs) 310, and provided to column signal line 312. Column signal line 312 conveys a bit line (BL) signal, which is proportional to the accumulated dot-products of the input data and weights along column signal line 312. The BL signal is then digitized using an analog-to-digital converter (ADC); bias, scaling and activation functions may be applied to the digitized signal to obtain the first element of converted output data matrix 216, i.e., $o_1$.

Figure 3B:
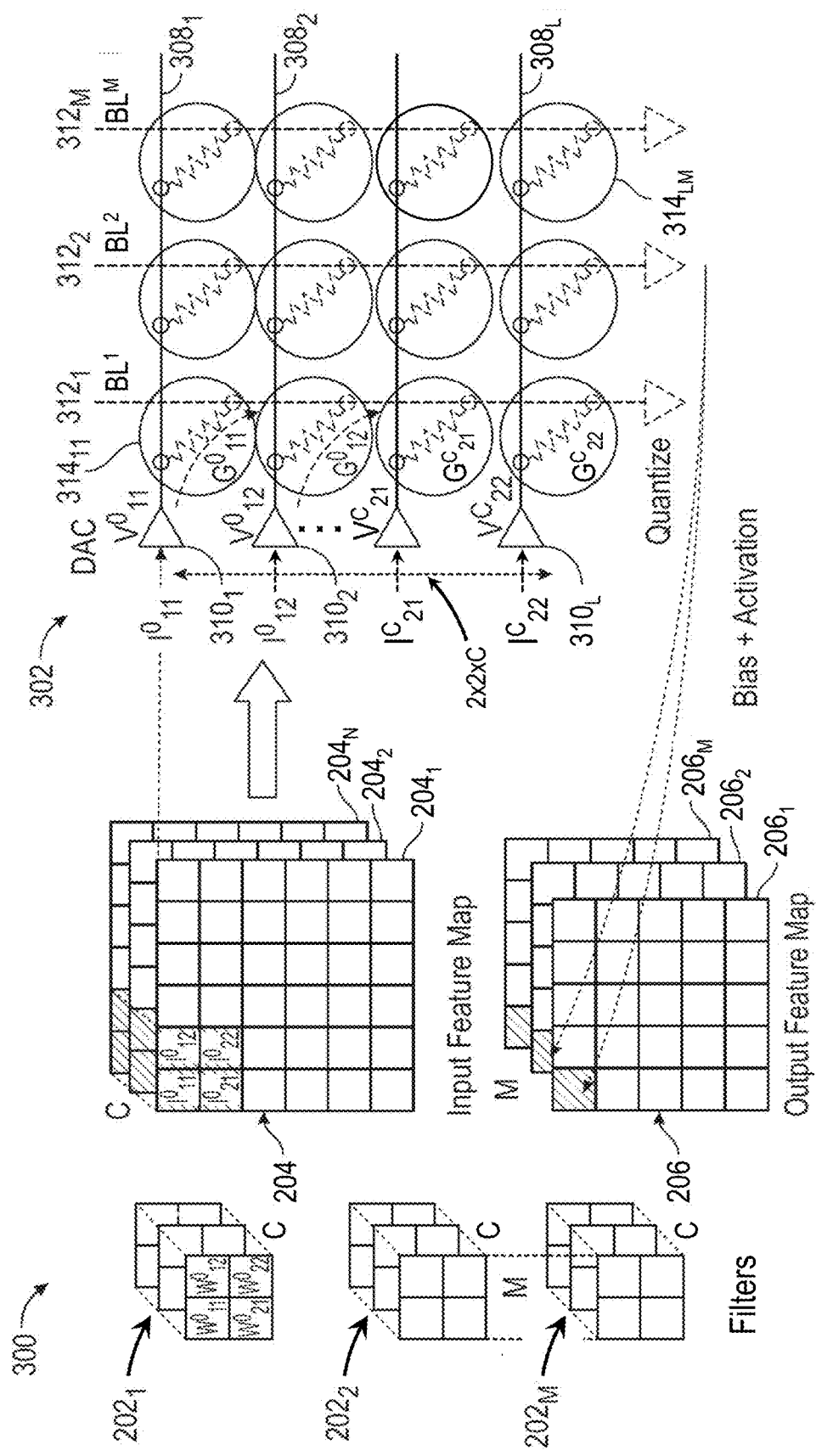
FIG. 3B depicts an architecture for a convolutional layer operation implemented using an NVM crossbar, in accordance with an embodiment of the present disclosure.

FIG. 3B depicts an architecture 300 for a convolutional layer operation implemented using NVM crossbar 302, in accordance with an embodiment of the present disclosure.

NVM crossbar 302 includes row signal lines 308, i.e., row signal lines $308_1, 308_2, \ldots, 308_L$, and column signal lines 312, i.e., column signal lines $312_1, 312_2, \ldots, 312_M$. A bitcell 314 is disposed at each intersection of row signal lines 308 and column signal lines 312, i.e., bitcells $314_{11}, \ldots, 314_M$. Each bitcell 314 includes one or more NVM elements that are programmed to represent a conductance value that is proportional to a particular of weight of a particular filter 202, such as, for example, $W^0_{11}$ of filter $202_1$, etc. In the first column, i.e., column signal line $312_1$, the conductances are depicted as $G^0_{11}$, $G^0_{12}, \ldots, G^c_{21}$, $G^c_{22}$.

It is generally useful to encode multiple linearly-separated resistance levels within an individual bit cell due to the wide separation between low-resistance state (LRS) $R_{ON}$ and the high-resistance state (HRS) $R_{OFF}$. In the case of correlated electron material RAM (CeRAM), the ratio of HRS/LRS is at least 2-orders of magnitude, which supports 4-bit encoding (i.e., 16 resistance levels).

Data from the input feature maps 204 are provided to crossbar 302 as inputs $I^0_{11}, \ldots, I^c_{22}$ along the row signal lines $308_1, \ldots, 308_L$, converted to analog voltages $V^0_{11}, \ldots, V^c_{22}$ by a digital-to-analog convertor (DAC), and conveyed across the NVM cell. In this embodiment, L is equal to four times the number of input channels, i.e., 2×2×C. The DAC includes DAC elements $310_1, \ldots, 310_L$. The column signal lines $312_1, \ldots, 312_M$ convey corresponding bit line (BL) signals $BL^1, \ldots, BL^M$, each of which is proportional to the accumulated dot-products of the input data and weights along that column signal line. Each BL signal is then digitized using an analog-to-digital converter (ADC); bias, scaling and activation functions may be applied to the digitized signals to obtain the output data for output feature maps 206.

Mapping a convolutional layer operation to an NVM crossbar with M filters and C input channels is generally depicted In FIG. 3B. In certain embodiments, the weights are stationary, i.e., the weights are programmed into the NVM crossbar once and do not change during the course of inference operations. Typical NVM elements, such as, for example, Phase-Change Memory and Resistive RAM, have a limited write "endurance," and it is possible to write to them a limited number of times (e.g., approximately $10^8$ times) after which the devices exhibit functional failure. Other NVM elements, such as, for example, Magnetic RAM and CeRAM, may exhibit relatively higher endurance (near $10^{12}$), but continuous operation may lead to a limited lifetime. Hence, such lifetime limits pose significant constraints on accelerator architectures that rely upon updating weights on a per-inference cycle.

For example, for an IoT-class accelerator operating at 100 MHz, an accelerator with an endurance of $10^8$ may have a lifetime of 1 second, while an accelerator with an endurance of $10^{12}$ may have a lifetime of 10,000 seconds or 4 days for a peak usage case. Unfortunately, such weights cannot be practically streamed from an external DRAM and must be fixed on-chip. Further, NVM bitcells suffer from high write-powers, and consequent expensive power consumption, which may effect the efficient performance of update operations. Thus, the write phase can be problematic and take a long time to complete.

Such arrangements differ from SRAM behavior, which has significantly higher write endurance, and may not be amenable to reprogramming the weights during inference. As a consequence, the entire ANN may need to be unrolled into an on-chip crossbar and fixed during inference. While this option has the advantage of eliminating DRAM power consumption, it may undesirably limit the maximum size of the ANN that can be programmed on-chip. Further, this option also incurs an area penalty as mapping larger ANNs requires instantiation of crossbars that are megabits in capacity. This consumes higher area and increases susceptibility to chip-failures due to yield loss. Moreover, instantiating multiple crossbars requires instantiation of multiple ADCs/DACs, all of which need to be programmed, trimmed and compensated for drift.

An NVM/CeRAM element is a particular type of random access memory formed, wholly or in part, from a correlated electron material. The CeRAM may exhibit an abrupt conductive or insulative state transition arising from electron correlations rather than solid state structural phase changes such as, for example, filamentary formation and conduction in resistive RAM devices. An abrupt conductor/insulator transition in a CeRAM may be responsive to a quantum mechanical phenomenon, in contrast to melting/solidification or filament formation.

A quantum mechanical transition of a CeRAM between an insulative state and a conductive state may be understood in terms of a Mott transition. In a Mott transition, a material may switch from an insulative state to a conductive state if a Mott transition condition occurs. When a critical carrier concentration is achieved such that a Mott criteria is met, the Mott transition will occur and the state will change from high resistance/impedance (or capacitance) to low resistance/impedance (or capacitance).

A "state" or "memory state" of the CeRAM element may be dependent on the impedance state or conductive state of the CeRAM element. In this context, the "state" or "memory state" means a detectable state of a memory device that is indicative of a value, symbol, parameter or condition, just to provide a few examples. In a particular implementation, a memory state of a memory device may be detected based, at least in part, on a signal detected on terminals of the memory device in a read operation. In another implementation, a memory device may be placed in a particular memory state to represent or store a particular value, symbol or parameter by application of one or more signals across terminals of the memory device in a "write operation."

A CeRAM element may comprise material sandwiched between conductive terminals. By applying a specific voltage and current between the terminals, the material may transition between the aforementioned conductive and insulative states. The material of a CeRAM element sandwiched between conductive terminals may be placed in an insulative state by application of a first programming signal across the terminals having a reset voltage and reset current at a reset current density, or placed in a conductive state by application of a second programming signal across the terminals having a set voltage and set current at set current density.

With respect to NVM crossbars 301 and 302, the accumulated dot-products of the input data and weights along each column signal line 312 may be represented by Equation 2, which represents a simple MAC operation. Each input data value (i.e., voltage V) is multiplied by the appropriate weight (i.e., conductance $G_i$), and the products are accumulated into a result (i.e., the current along the BL).

$$BL = \Sigma_{i=0 \ldots L}(G_i * Vi) \quad \text{(Eq. 2)}$$

Embodiments of the present disclosure advantageously refactor the MAC operation for each column signal line 312 into an initial summation of voltages $V_i$ that are to be multiplied by a particular conductance value $G_k$, followed by a MAC operation that accumulates the product of the each voltage sum and that particular conductance value $G_k$. In certain embodiments, the conductance value may be represented by a 4-bit (k-bit) number, which provides for 16 different values (K values), such as, for example, $G_1$, $G_2$, $G_3$, $G_4$, $G_5$, $G_6$, $G_7$, $G_8$, $G_9$, $G_{10}$, $G_{11}$, $G_{12}$, $G_{13}$, $G_{14}$, $G_{15}$ and $G_{16}$. Other bit sizes are also contemplated, such as, for example, 2-bits, 3-bits, etc.

For example, with respect to FIG. 3A, the conductance $g^1_1$ may have the value $G_1$, the conductance $g^1_2$ may have the value $G_2$, the conductance $g^1_3$ may have the value $G_3$, the conductance $g^1_4$ may have the value $G_4$, the conductance $g^2_1$ may have the value $G_3$, the conductance $g^2_2$ may have the value $G_4$, the conductance $g^2_3$ may have the value $G_5$, the conductance $g^2_4$ may have the value $G_6$, the conductance $g^3_1$ may have the value $G_5$, the conductance $g^3_2$ may have the value $G_6$, the conductance $g^3_3$ may have the value $G_7$, and the conductance $g^3_4$ may have the value $G_8$.

In this example, conductances $g^1_3$ and $g^2_1$ have the same conductance $G_3$, conductances $g^1_4$ and $g^2_2$ have the same conductance $G_4$, conductances $g^2_3$ and $g^3_1$ have the same conductance $G_5$, conductances $g^2_4$ and $g^3_2$ have the same conductance $G_6$. Accordingly, $V^1_7$ and $V^2_1$ may be summed first, and then multiplied by conductance $G_3$ during the subsequent MAC operation, $V^1_8$ and $V^2_2$ may be summed first, and then multiplied by conductance $G_4$ during the subsequent MAC operation, $V^2_7$ and $V^3_1$ may be summed first, and then multiplied by conductance $G_5$ during the subsequent MAC operation, and $V^2_8$ and $V^3_2$ may be summed first, and then multiplied by conductance $G_6$ during the subsequent MAC operation.

Additionally, rather summing only the voltages $V_i$ that are to be multiplied by a particular conductance value $G_k$, the remaining voltages may be set to zero (0) and then all of the voltages may be initially summed. In the above example, for the conductance $G_3$, the other 10 voltages are set to zero, i.e., $V^1_1$, $V^1_2$, $V^1_8$, $V^2_2$, $V^2_7$, $V^2_8$, $V^3_1$, $V^3_2$, $V^3_7$ and $V^3_8$, and then all of the voltages are summed. Generally, this process is repeated for each conductance value, including conductances that are to be multiplied by a single voltage. In the above example, for the conductance $G_1$, the other 11 voltages are set to zero, i.e., $V^1_2$, $V^1_7$, $V^1_8$, $V^2_1$, $V^2_2$, $V^2_7$, $V^2_8$, $V^3_1$, $V^3_2$, $V^3_7$ and $V^3_8$, and then all of the voltages are summed.

The refactored MAC operation for each column signal line 312 may be represented by Equations 3 and 4.

$$BL = G_0 * \Sigma_{i=0 \ldots L} V_i + G_1 * \Sigma_{i=0 \ldots L} V_i + \ldots + G_{15} * \Sigma_{i=0 \ldots L} V_i \quad \text{(Eq. 3)}$$

$$BL = \Sigma_{k=0 \ldots 15} G_k * \Sigma_{i=0 \ldots L} V_i \quad \text{(Eq. 4)}$$

where, for each input data value L, $V_i$ is set to zero (0) when $G_k$ does not correspond to the appropriate weight for that input data value.

Advantageously, refactoring the MAC operation, as represented by Eq. 4, leads to a simpler implementation where all input multiplicands are initially added to conditionally add together the input activations depending on whether they factor into the MAC operation with a specific weight value. The initial addition operation can be done using NVM elements. However, in accordance with embodiments of the present disclosure, these NVM elements need not be precisely programmed. A binary weight encoding ($R_{ON}/R_{OFF}$) is utilized to connect an input activation to a weight value without need for precision programming.

Figure 4A:
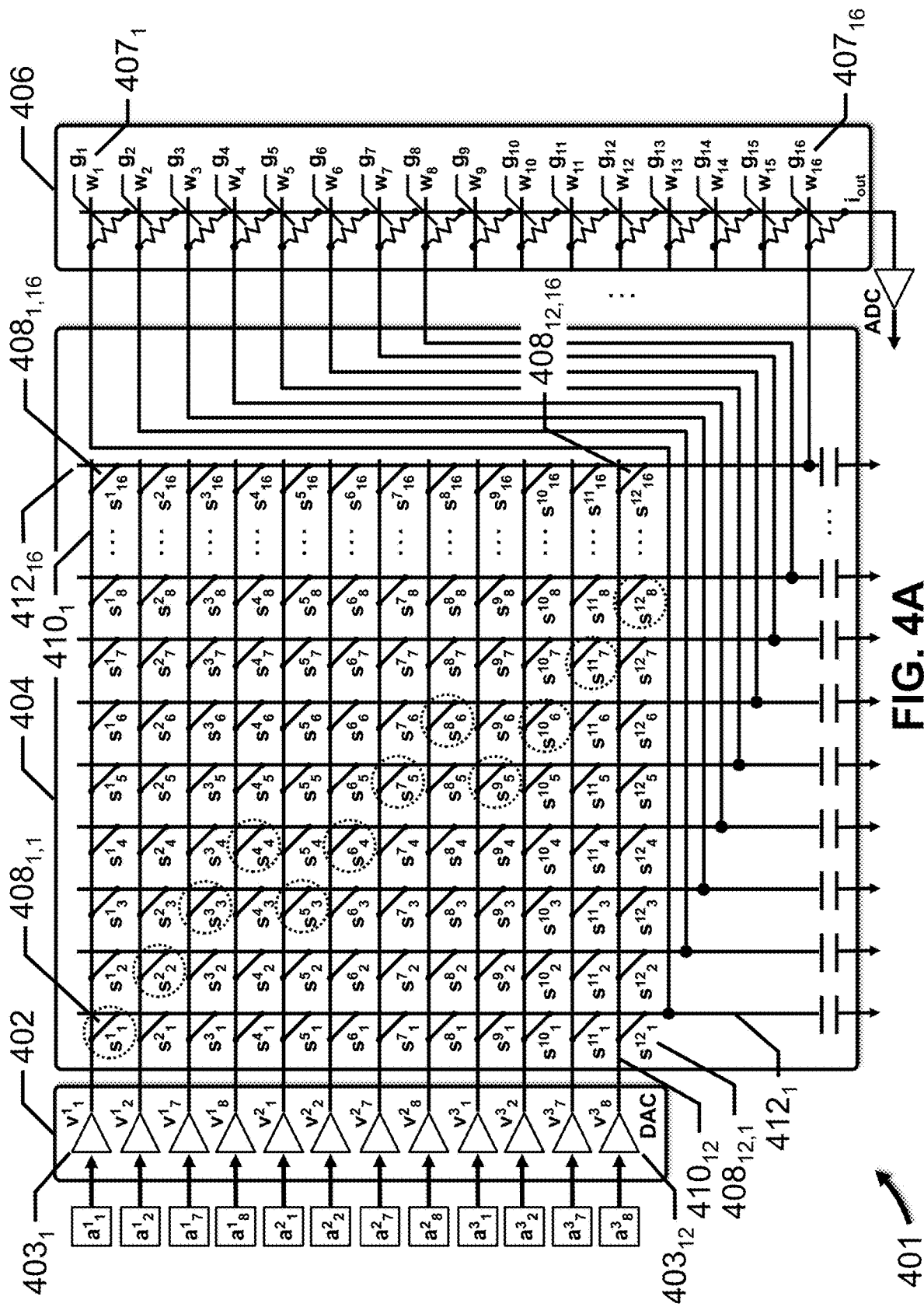
FIG. 4A depicts a schematic of an architecture for a refactored MAC operation, in accordance with an embodiment of the present disclosure.

FIG. 4A depicts a schematic of an architecture 401 for a refactored MAC operation, in accordance with an embodiment of the present disclosure. In this embodiment, architecture 401 includes DAC block 402, crossbar 404 and a multiplier/scaling module 406.

Generally, crossbar 404 includes M×N elements. In this embodiment, M equals 12, N equals 16 and crossbar 404 includes 192 elements, nodes or bitcells $408_{1,1}, \ldots, 408_{12,16}$, provided at each junction of 12 row signal lines $410_1, \ldots, 410_{12}$ and 16 column signal lines $412_1, \ldots, 412_{16}$. Each respective bitcell $408_{1,1}, \ldots 408_{12,16}$ includes one or more NVM elements, represented by $s^i_j$, to store the state (e.g., $R_{ON}/R_{OFF}$) for that bitcell. Bitcells 408 are switchable between a first impedance state and a second impedance state ($R_{ON}/R_{OFF}$).

Multiplier/scaling module 406 includes 16 bitcells $407_1, \ldots, 407_{16}$ that have programmable conductances or impedances $g_1, g_2, g_3, g_4, g_5, g_6, g_7, g_8, g_9, g_{10}, g_{11}, g_{12}, g_{13}, g_{14}, g_{15}$ and $g_{16}$ that are configured to correspond to 16 different weights values $w_1, w_2, w_3, w_4, w_5, w_6, w_7, w_8, w_9, w_{10}, w_{11}, w_{12}, w_{13}, w_{14}, w_{15}$ and $w_{16}$, respectively.

Input data, i.e., $a^1_1, a^1_2, a^1_7, a^1_8, a^2_1, a^2_2, a^2_7, a^2_8, a^3_1, a^3_2, a^3_7$ and $a^3_8$, are provided to DAC block 402, converted to analog voltages $v^1_1, v^1_2, v^1_7, v^1_8, v^2_1, v^2_2, v^2_7, v^2_8, v^3_1, v^3_2, v^3_7$ and $v^3_8$, and then provided to respective row signal lines $410_1, \ldots, 410_{12}$. The voltages are first summed together in the crossbar 404 by placing the bitcells $408_{11}, \ldots, 408_{MN}$ into $R_{ON}/R_{OFF}$ states, where the NVM elements do not require precision programming.

In the example described above, bitcells 408 that associated with voltages that are to be summed for a particular conductance value are set to the $R_{ON}$ state. These bitcells 408 include NVM elements $s^1_1, s^2_2, s^3_3, s^4_4, s^5_3, s^6_4, s^7_5, s^8_6, s^9_5 s^{10}_6, s^{11}_7$ and $s^{12}_8$ (identified by dotted circles in FIG. 4A). The remaining NVM element are set to the $R_{OFF}$ state, which provides a zero voltage value.

A summed signal from each column signal line $412_1, \ldots, 412_{16}$ is input to a respective bitcell $407_1, \ldots, 407_{16}$ of the multiplier/scaling module 406, and the MAC operation occurs in a single column in the multiplier/scaling module 406 where all elements are precisely programmed (16 elements in total).

Generally, converted input data matrix 214 includes the total number of input data values that are provided to DAC block 402, one column of input data values at a time. In the example depicted in FIG. 2D, the total number of input data values in input data matrix is 300 (i.e., 12×25). Accordingly, the input data signals (e.g., $a^1_1, \ldots a^3_8$) are a set of M (e.g., 12) input signals selected from a total number of input signals (e.g., 300) that is significantly greater than N (e.g., 16).

Figure 4B:
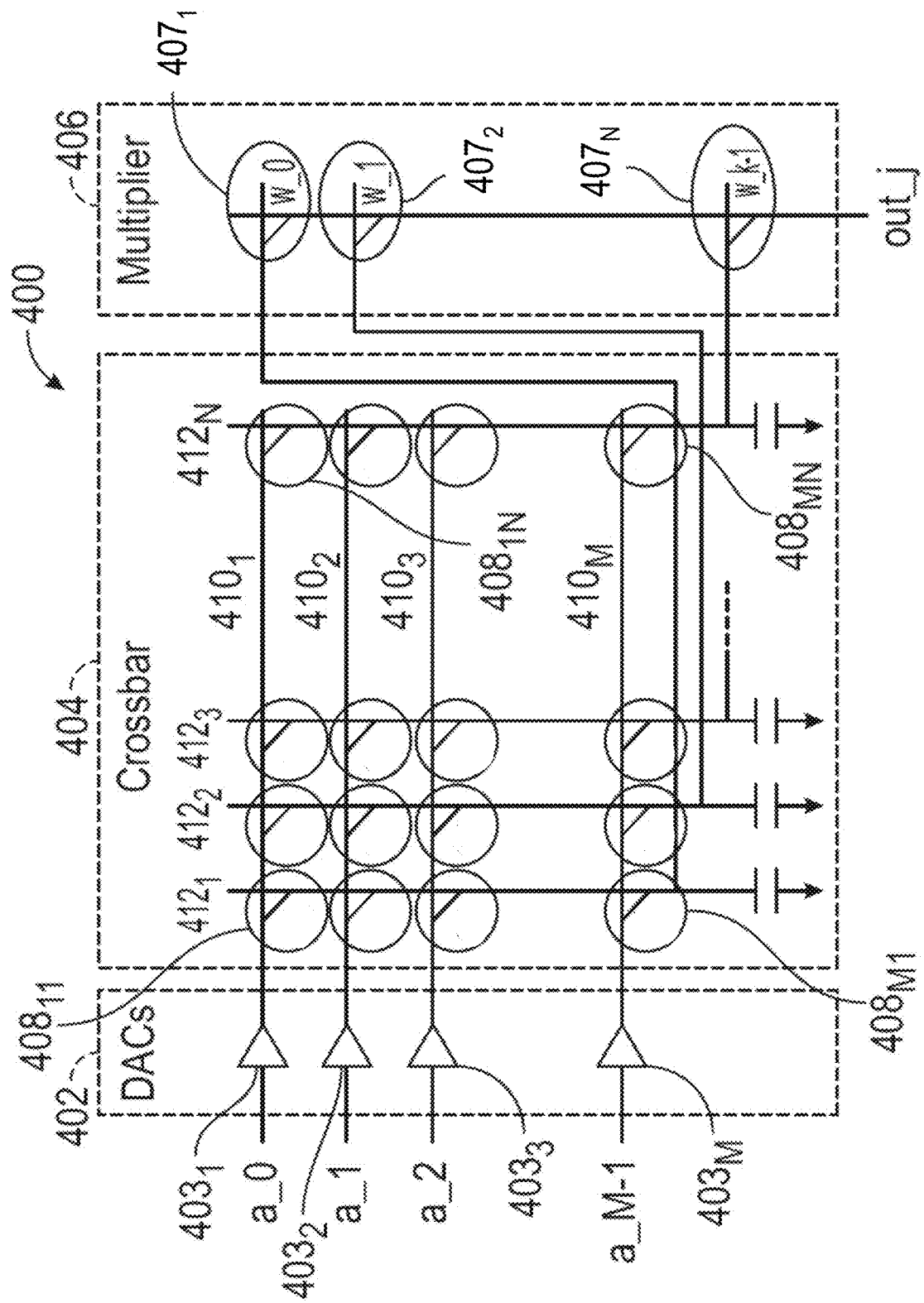
FIG. 4B depicts a schematic of an architecture for a refactored MAC operation, in accordance with an embodiment of the present disclosure.

FIG. 4B depicts a schematic of an architecture 400 for a refactored MAC operation, in accordance with an embodiment of the present disclosure. In this embodiment, architecture 400 includes DAC block 402 of M DACs $403_1, \ldots, 403_m$, crossbar 404 and multiplier/scaling module 406.

In many embodiments, architecture 400 encodes the weights for a single filter 202, and generates a single, output feature map 206 for that filter 202. In other embodiments, a separate crossbar 404 and multiplier/scaling module 406 pair may be provided for each filter 202 to generate the output feature map 206 for that filter 202. Each crossbar 404 and multiplier/scaling module 406 pair may be coupled to a common DAC block 402.

Crossbar 404 includes M×N elements, nodes or bitcells $408_{11}, \ldots, 408_{MN}$, provided at each junction of row signal lines $410_1, 410_2, 410_3, \ldots, 410_M$ and column signal lines $412_1, 412_2, 412_3, \ldots, 412_N$ as shown. Each respective bitcell $408_{11}, \ldots, 408_{MN}$ includes one or more NVM elements to store the state (e.g., $R_{ON}/R_{OFF}$) for that bitcell. As described above, bitcells 408 are switchable between a first impedance state and a second impedance state ($R_{ON}/R_{OFF}$).

Multiplier/scaling module 406 includes bitcells $407_1, \ldots, 407_N$ that have programmable conductances or impedances that are programmed to correspond to weights $w\_0, w\_1, w\_K-1$. Input data, such as, for example, activations $a\_0, a\_1, a\_M-1$, along respective row signal lines $410_1, 410_2, 410_3, \ldots, 410_M$ are first summed together in the crossbar 404 by placing the bitcells $408_{11}, \ldots, 408_{MN}$ into $R_{ON}/R_{OFF}$ states, as described above, where the NVM elements do not require precision programming. In this embodiment, certain bitcells among bitcells $408_{1,1}, \ldots, 408_{MN}$ are switched between impedance states as shown. A summed signal from each column N is input to a respective bitcell $407_1, \ldots, 407_N$ of the multiplier/scaling module 406, and the final MAC computation occurs in a single column in the multiplier/scaling module 406 where all elements are precisely programmed (N elements in total).

Figure 5:
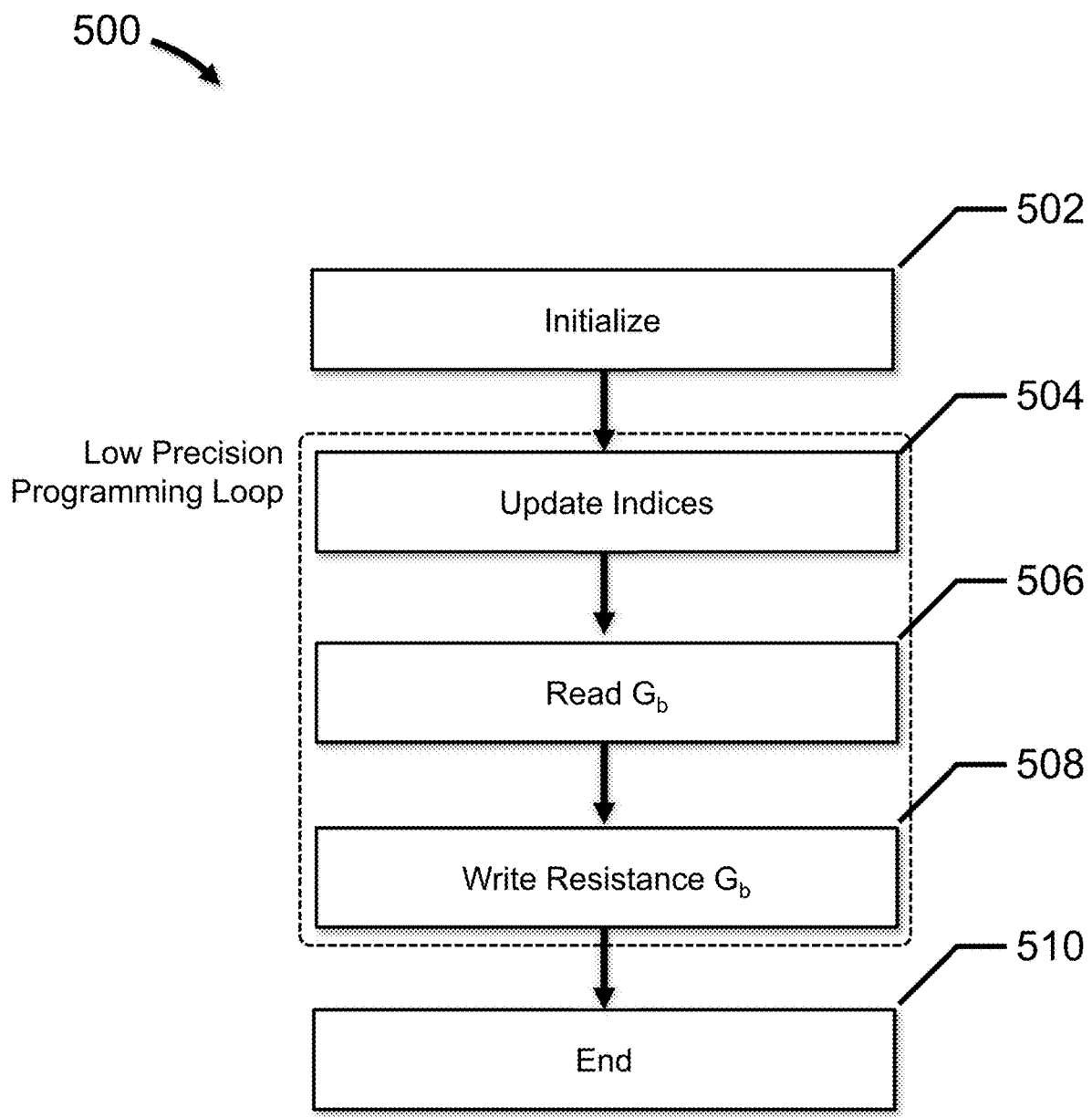
FIG. 5 depicts a flow diagram of a low-precision programming process for a refactored MAC operation, in accordance with an embodiment of the present disclosure.

FIG. 5 depicts a flow diagram of a low-precision programming process 500 for a refactored MAC operation, in accordance with an embodiment of the present disclosure.

In the embodiment depicted in FIG. 4B, crossbar 404 includes M×N elements and multiplier/scaling module 406 includes N different weight values; k is the bit size of each weight value (i.e., the number of bits), and $N=K=2^k$. M×N elements are low-precision (or binary) programmed NVM elements, and N elements are high-precision programmed NVM elements.

In block 502, the process is initialized and proceeds to block 504 of the low-precision write loop. In block 504, the indices of the elements of crossbar 404 are updated. In block 506, the binary resistance or conductance Gb for each element of crossbar 404 is read. Then, in block 508, Gb for each element of crossbar 404 is written. The process terminates at block 510. In this embodiment, the M×N elements are programmed to either a "0" ($R_{OFF}$) or a "1" ($R_{ON}$). From here, the elements of multiplier/scaling module 406 are precision programmed.

Figure 6:
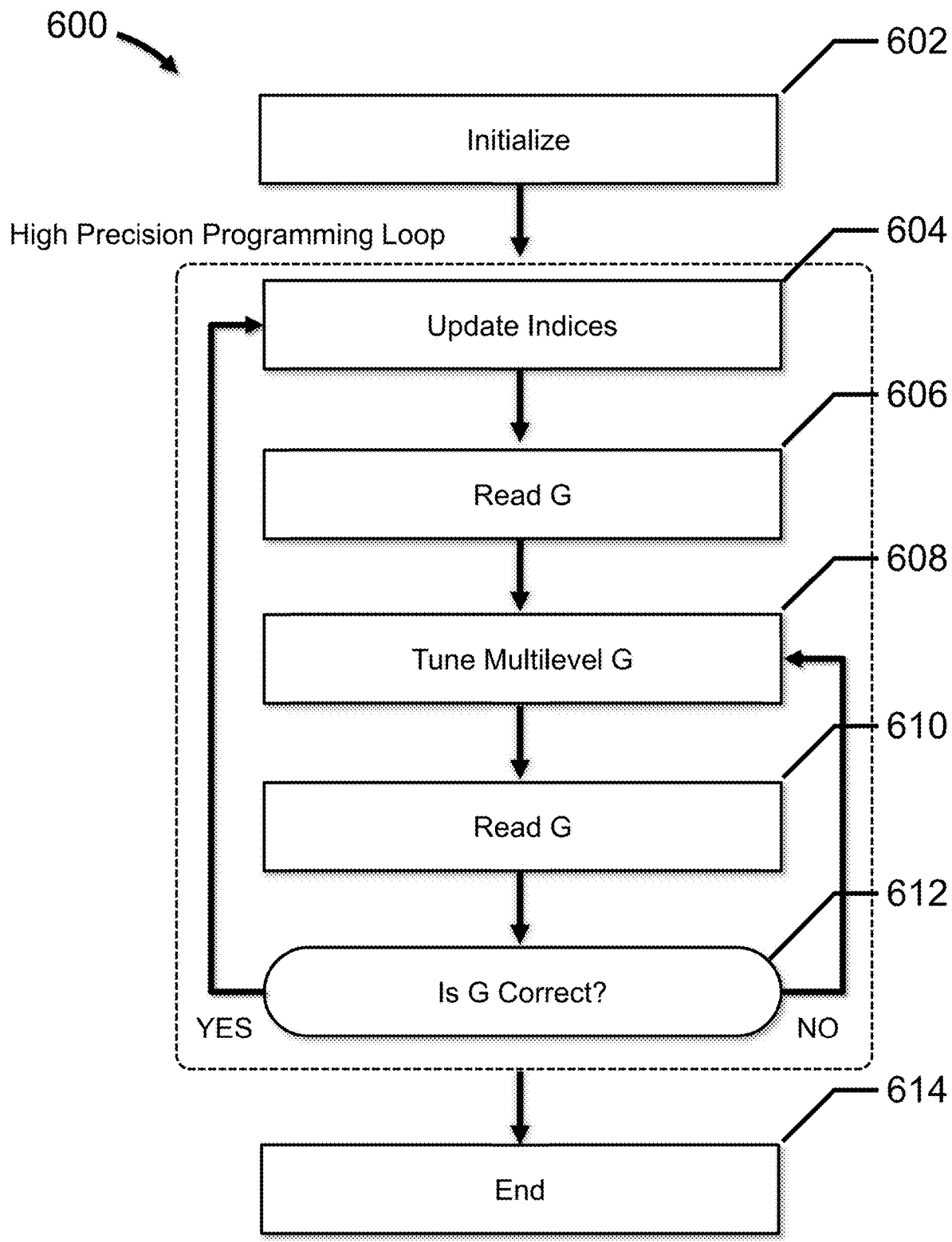
FIG. 6 depicts a flow diagram of a high-precision programming process for multiplier/scaling module, in accordance with an embodiment of the present disclosure.

FIG. 6 depicts a flow diagram of a high-precision programming process 600 for multiplier/scaling module 406, in accordance with an embodiment of the present disclosure.

In block 602, the process is initialized and proceeds to block 604 of the high-precision write loop. In block 604, the indices of the elements of multiplier/scaling module 406 are updated. In block 606, the multilevel resistance or conductance G for each element of multiplier/scaling module 406 is read. A high-precision operation changes the conductance or resistivity to a very precise known value. Then, in block 608, the multilevel G is tuned for each element of multiplier/scaling module 406. Then, in block 610, the multilevel G is read, and the correct multilevel G verified in block 612. The process loops back to block 604 if the multilevel G is correct, otherwise, the process proceeds back to block 608 for further tuning. The process terminates at block 614.

Figure 7:
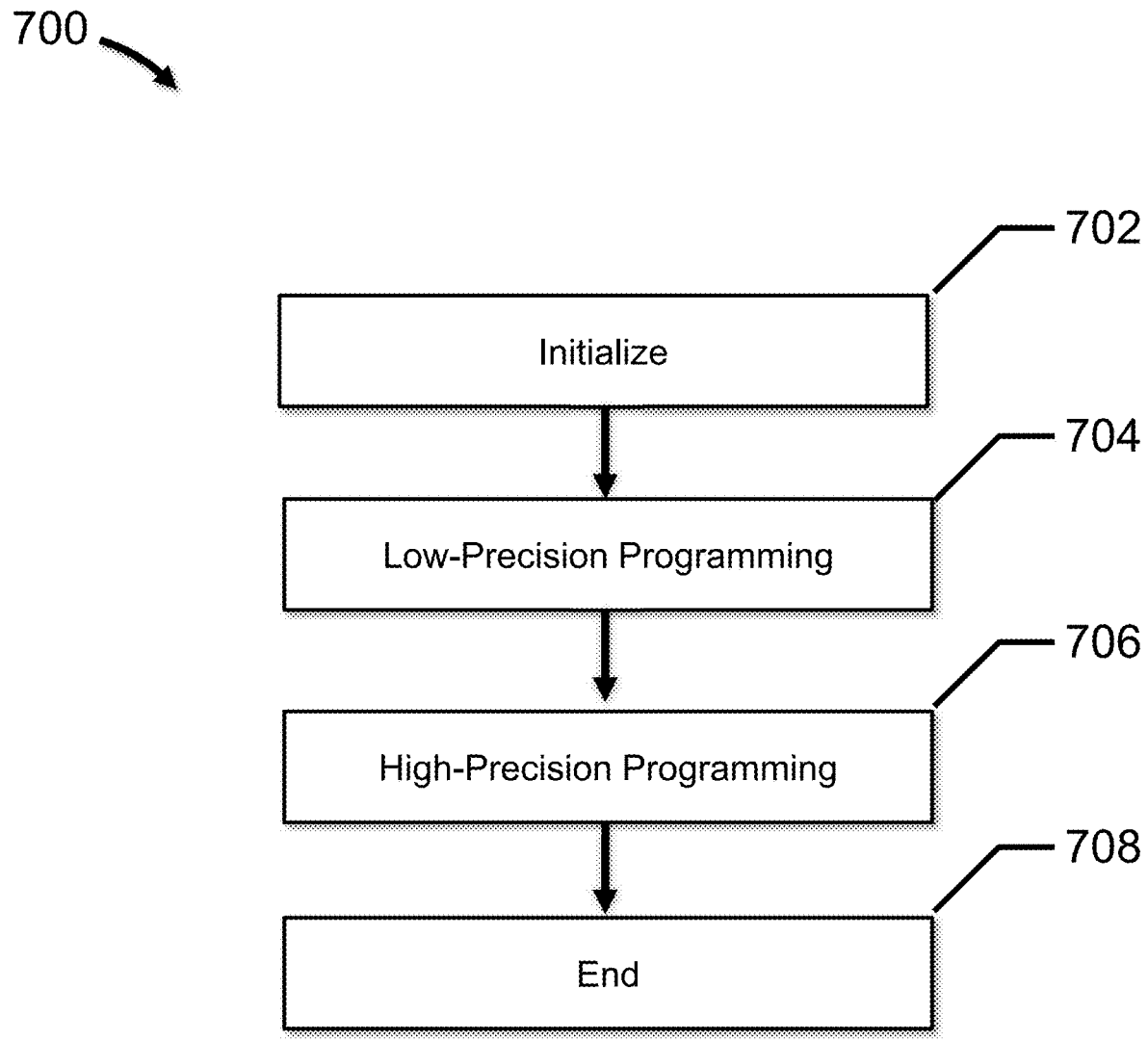
FIG. 7 depicts a flow diagram of a method for performing multiply-accumulate acceleration in a neural network, in accordance with an embodiment of the present disclosure.

FIG. 7 depicts a flow diagram 700 of a method for performing multiply-accumulate acceleration in a neural network, in accordance with an embodiment of the present disclosure.

The method is initialized at block 702, and proceeds to block 704 which corresponds to the low-precision programming process 500 shown in FIG. 5. With respect to FIG. 4B, in the low-precision programming process 500, the input activations a_0, a_1, a_M-1 are applied to a summing array, i.e., crossbar 404. A summed signal is generated by each column of NVM elements in the summing array by the low-precision programming process 500. The process proceeds to block 706, which corresponds to the high-precision programming process 600 shown in FIG. 6. In the high-precision programming process 600, the summed signal is input to a multiplying array, i.e., multiplier/scaling module 406, having a plurality of NVM elements. In block 706, each NVM element in the multiplying array is precisely programmed to a resistance or conductance level proportional to a weight, as shown in the flow diagram of FIG. 6. The process terminates at block 708.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "deriving" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Accordingly, embodiments and features of the present disclosure include, but are not limited to, the foregoing and following combinable embodiments.

In one embodiment, an apparatus includes a crossbar and a multiplier. The crossbar includes a plurality of crossbar nodes arranged in an array of rows and columns, each crossbar node is programmable to a first resistance level or a second resistance level, and the crossbar is configured to sum a plurality of analog input activation signals over each column of crossbar nodes and output a plurality of summed activation signals. The multiplier is coupled to the crossbar and includes a plurality of multiplier nodes, each multiplier node is programmable to a different conductance level proportional to one of a plurality of neural network weights, and the multiplier is configured to sum the plurality of summed activation signals over the multiplier nodes and output an analog output activation signal.

In another embodiment of the apparatus, each crossbar node includes one or more non-volatile elements (NVMs), and each multiplier node includes a plurality of NVMs.

In another embodiment of the apparatus, the crossbar includes M rows, N columns and M×N crossbar nodes, and the multiplier includes N multiplier nodes.

In another embodiment of the apparatus, the apparatus further includes a plurality of digital-to-analog converters (DACs) coupled to the crossbar, each DAC being configured to receive a digital input activation signal and output one of the plurality of analog input activation signals.

In another embodiment of the apparatus, each non-volatile memory element in each multiplier node is programmed to the different conductance level based on a bit size, k, of the neural network weights.

In another embodiment of the apparatus, a total number of conductance levels is equal to $2^k$.

In one embodiment, a method includes generating, in a summing array including a plurality of non-volatile memory elements arranged in columns, a summed signal for each column based, at least in part, on a plurality of input signals, each non-volatile memory element in the summing array being programmed to a high resistance state or a low resistance state based on weights of a neural network; and generating, in a multiplying array including a plurality of non-volatile memory elements, an output signal based, at least in part, on the summed signals from the summing array, each non volatile memory element in the multiplying array being programmed to a different conductance level based on the weights of the neural network.

In another embodiment of the method, each non-volatile memory element in the summing array is configured to receive an input signal and add the input signal to the summed signal for a respective column based on the programmed resistance state; each non-volatile memory element in the multiplying array is configured to receive a summed signal from a different column of the summing array and adjust the summed signal based on the programmed conductance level to generate an adjusted summed signal; and the output signal is a combination of the adjusted summed signals.

In another embodiment of the method, each non-volatile memory element in the summing array is configured to add the input signal to the summed signal for a respective column when programmed to the low resistance state, and not add the input signal to the summed signal for the respective column when programmed to the high resistance state.

In another embodiment of the method, the summing array is a crossbar having M rows, N columns and M×N non-volatile memory elements, and where the multiplying array has N elements.

In another embodiment of the method, the plurality of input signals is a set of M input signals selected from a total number of input signals that is significantly greater than N.

In another embodiment of the method, each non-volatile memory element in the multiplying array is programmed to the different conductance level based on a bit size, k, of the weights of the neural network.

In another embodiment of the method, a total number of conductance levels is equal to $2^k$.

In one embodiment, another apparatus includes a summing array including a plurality of non-volatile memory elements arranged in columns, each non-volatile memory element in the summing array being programmed to a high resistance state or a low resistance state based on weights of a neural network, the summing array configured to generate a summed signal for each column based, at least in part, on a plurality of input signals; and a multiplying array, coupled to the summing array, including a plurality of non-volatile memory elements, each non volatile memory element in the multiplying array being programmed to a different conductance level based on the weights of the neural network, the multiplying array configured to generate an output signal based, at least in part, on the summed signals from the summing array.

In another embodiment of the apparatus, each non-volatile memory element in the summing array is configured to receive an input signal and add the input signal to the summed signal for a respective column based on the programmed resistance state; each non-volatile memory element in the multiplying array is configured to receive a summed signal from a different column of the summing array and adjust the summed signal based on the programmed conductance level to generate an adjusted summed signal; and the output signal is a combination of the adjusted summed signals.

In another embodiment of the apparatus, each non-volatile memory element in the summing array is configured to add the input signal to the summed signal for the respective column when programmed to the low resistance state, and not add the input signal to the summed signal for the respective column when programmed to the high resistance state.

In another embodiment of the apparatus, the summing array is a crossbar having M rows, N columns and M×N non-volatile memory elements, and where the multiplying array has N elements.

In another embodiment of the apparatus, the plurality of input signals is a set of M input signals selected from a total number of input signals that is significantly greater than N.

In another embodiment of the apparatus, each non-volatile memory element in the multiplying array is programmed to the different conductance level based on a bit size, k, of the weights of the neural network.

In another embodiment of the apparatus, a total number of conductance levels is equal to $2^k$.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the foregoing detailed description of embodiments of the present disclosure, numerous specific details are set forth in order to provide a more thorough understanding of the present disclosure. However, it will be apparent to those skilled in the art that the present disclosure may be practiced without these specific details. In other instances, well-known features have not been described in detail to avoid unnecessarily complicating the description.

It is to be understood that the terminology used herein is for the purposes of describing various embodiments in accordance with the present disclosure and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with the foregoing, a method and architecture for performing refactored multiply-and-accumulate operations is disclosed. Having thus described the present disclosure of the present application in detail and by reference to embodiments thereof, it will be apparent that modifications and variations are possible without departing from the scope defined in the appended claims.

What is claimed is:

1. An apparatus, comprising:
a crossbar including a plurality of crossbar nodes arranged in an array of rows and columns, each crossbar node being programmable to a first resistance level or a second resistance level, the crossbar being configured to sum a plurality of analog input activation signals over each column of crossbar nodes and output a plurality of summed activation signals; and
a multiplier, coupled to the crossbar, including a plurality of multiplier nodes, each multiplier node being programmable to a different conductance level proportional to one of a plurality of neural network weights, the multiplier being configured to sum the plurality of summed activation signals over the multiplier nodes and output an analog output activation signal.

2. The apparatus of claim 1, where each crossbar node includes one or more non-volatile elements (NVMs), and each multiplier node includes a plurality of NVMs.

3. The apparatus of claim 2, where the crossbar includes M rows, N columns and M×N crossbar nodes, and the multiplier includes N multiplier nodes.

4. The apparatus of claim 1, further comprising:
a plurality of digital-to-analog converters (DACs) coupled to the crossbar, each DAC being configured to receive a digital input activation signal and output one of the plurality of analog input activation signals.

5. The apparatus of claim 1, where each non-volatile memory element in each multiplier node is programmed to the different conductance level based on a bit size, k, of the neural network weights.

6. The apparatus of claim 5, where a total number of conductance levels is equal to $2^k$.

7. A method for performing a refactored multiply-and-accumulate operation, comprising:
generating, in a summing array including a plurality of non-volatile memory elements arranged in columns, a summed signal for each column based, at least in part, on a plurality of input signals, each non-volatile memory element in the summing array being programmed to a high resistance state or a low resistance state based on weights of a neural network; and
generating, in a multiplying array including a plurality of non-volatile memory elements, an output signal based, at least in part, on the summed signals from the summing array, each non-volatile memory element in the multiplying array being programmed to a different conductance level based on the weights of the neural network.

8. The method of claim 7, where:
each non-volatile memory element in the summing array is configured to receive an input signal and add the input signal to the summed signal for a respective column based on the programmed resistance state;
each non-volatile memory element in the multiplying array is configured to receive a summed signal from a different column of the summing array and adjust the summed signal based on the programmed conductance level to generate an adjusted summed signal; and
the output signal is a combination of the adjusted summed signals.

9. The method of claim 8, where each non-volatile memory element in the summing array is configured to add the input signal to the summed signal for a respective column when programmed to the low resistance state, and not add the input signal to the summed signal for the respective column when programmed to the high resistance state.

10. The method of claim 9, where the summing array is a crossbar having M rows, N columns and M×N non-volatile memory elements, and where the multiplying array has N elements.

11. The method of claim 10, where the plurality of input signals is a set of M input signals selected from a total number of input signals that is significantly greater than N.

12. The method of claim 7, where each non-volatile memory element in the multiplying array is programmed to the different conductance level based on a bit size, k, of the weights of the neural network.

13. The method of claim 12, where a total number of conductance levels is equal to $2^k$.

14. An apparatus, comprising:
a summing array including a plurality of non-volatile memory elements arranged in columns, each non-volatile memory element in the summing array being programmed to a high resistance state or a low resistance state based on weights of a neural network, the summing array configured to generate a summed signal for each column based, at least in part, on a plurality of input signals; and
a multiplying array, coupled to the summing array, including a plurality of non-volatile memory elements, each non-volatile memory element in the multiplying array being programmed to a different conductance level based on the weights of the neural network, the multiplying array configured to generate an output signal based, at least in part, on the summed signals from the summing array.

15. The apparatus of claim 14, where:
each non-volatile memory element in the summing array is configured to receive an input signal and add the input signal to the summed signal for a respective column based on the programmed resistance state;
each non-volatile memory element in the multiplying array is configured to receive a summed signal from a different column of the summing array and adjust the summed signal based on the programmed conductance level to generate an adjusted summed signal; and
the output signal is a combination of the adjusted summed signals.

16. The apparatus of claim 15, where each non-volatile memory element in the summing array is configured to add the input signal to the summed signal for the respective column when programmed to the low resistance state, and not add the input signal to the summed signal for the respective column when programmed to the high resistance state.

17. The apparatus of claim 16, where the summing array is a crossbar having M rows, N columns and M×N non-volatile memory elements, and where the multiplying array has N elements.

18. The apparatus of claim 17, where the plurality of input signals is a set of M input signals selected from a total number of input signals that is significantly greater than N.

19. The apparatus of claim 14, where each non-volatile memory element in the multiplying array is programmed to the different conductance level based on a bit size, k, of the weights of the neural network.

20. The apparatus of claim 19, where a total number of conductance levels is equal to $2^k$.

* * * * *